Nov. 13, 1951  O. M. ARNOLD  2,575,251
METHOD OF WELDING BODIES
Filed Sept. 9, 1943
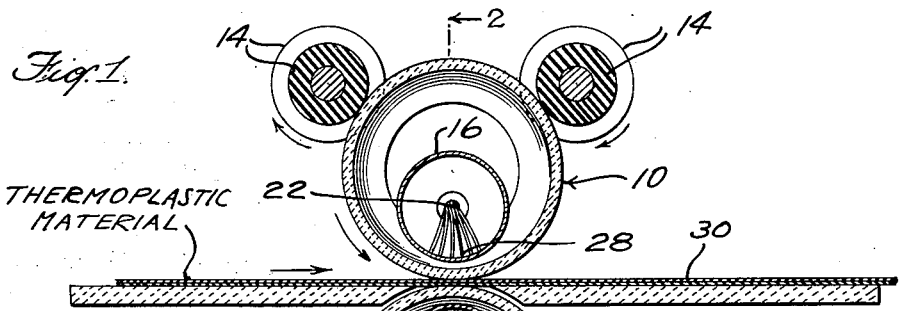
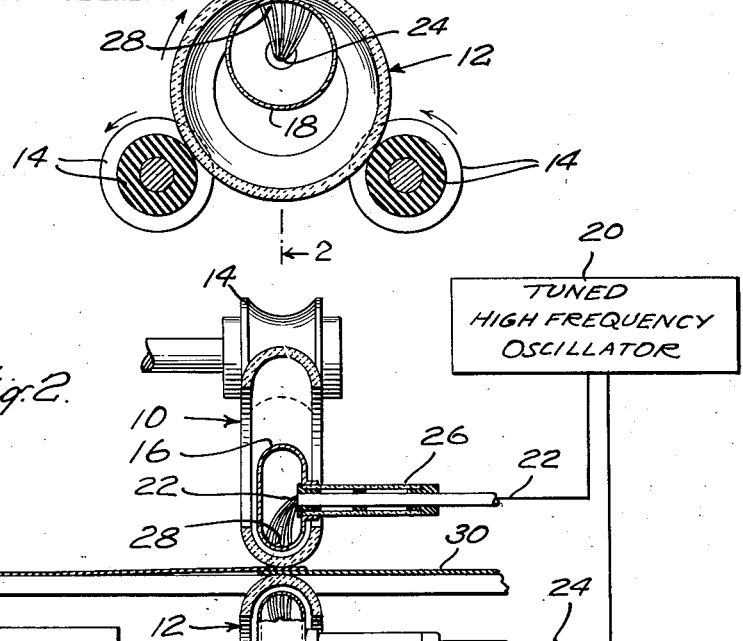
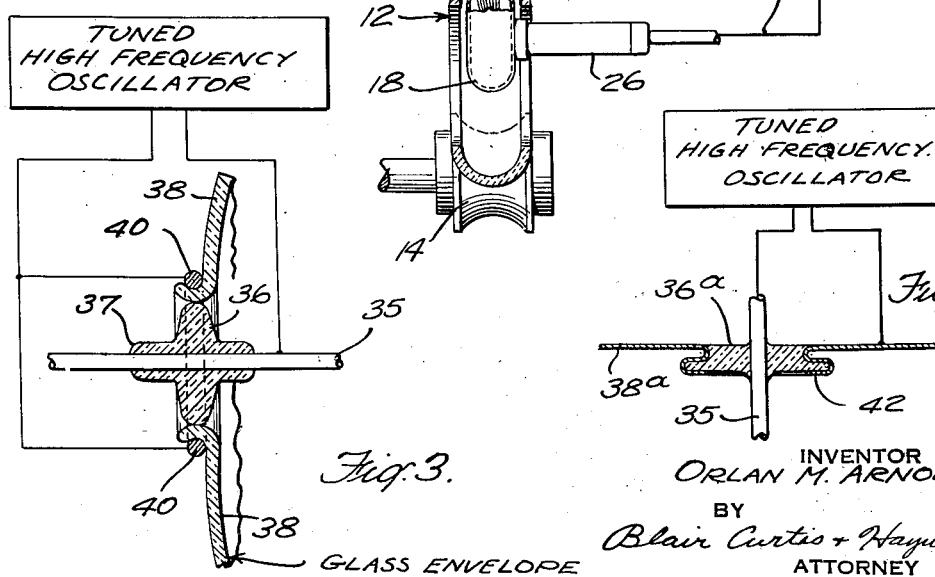
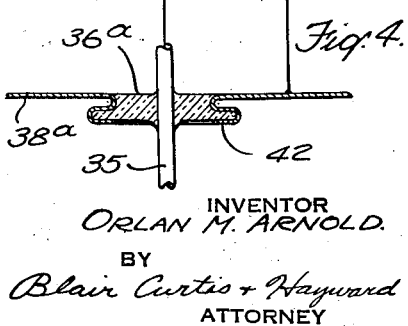
INVENTOR
ORLAN M. ARNOLD
BY
Blair Curtis + Hayward
ATTORNEY Patented Nov. 13, 1951

2,575,251

UNITED STATES PATENT OFFICE 2,575,251

METHOD OF WELDING BODIES

Orlan M. Arnold, Troy, N. Y.

Application September 9, 1943, Serial No. 501,707

4 Claims. (Cl. 154—126.5)

1

This invention relates to treatment with alternating and intermittent electrostatic fields, and to the application of energy in desired areas or locations for such purposes as welding, fusion, diffusion, brazing, cutting, vaporization, distillation and reactions of various types, to apparatus useful for such purposes and to products of such treatment.

The more specific inventions in the fields of chemical reactions, catalysis, vaporization, distillation, etc., are the subjects of separate copending applications, Serial Nos. 504,902, now abandoned, 576,151, now Patent No. 2,522,082, and 576,245, filed respectively October 14, 1943, February 3, 1945 and February 5, 1945.

Prior to my present invention high frequency fields have been used for heating by induction and by ohmic-conductance in material having ions or electrons more or less free to migrate for conduction of current. My present invention is to be distinguished from this type of high frequency heating, although, depending upon the material under treatment there may be more or less of this type of heating occurring as an unavoidable side effect, desirable or to be minimized according to the particular results desired.

More recently heating of various substances has been accomplished by direct passage of a high frequency current between electrodes applied to opposite sides of the substance. This has been widely applied, for example, in producing artificial fever in human bodies, and in the heating of fusible binders in laminating or molding of plastics.

It has also become known that, when polar substances are tested under carefully regulated conditions of a laboratory cell, with low voltage and with currents sufficiently minute to avoid any substantial heating of a substance as a whole, there is an energy absorption due to the tendency of such polar molecules to orient themselves in the electrostatic field and to reverse their orientation to follow the alternating polarity of the field; this tendency, being opposed by other forces such as the thermal impacts of other molecules and mutual attraction with other molecules, ions, atoms, etc., in the medium in which they exist; and that such absorption of energy from the field rises to a maximum under certain conditions. In a paper presented to the American Electro Chemical Society (Transactions of the Electro Chemical Society, vol. 74 (1938), pp. 193–210), my co-workers, George W. Gross and Henry C. Ott, and I have described the theory and application of such laboratory technique as applied

2 to the study of methacrylate resins. In a more recent paper such tests and the information derived from them is discussed more generally by Raymond M. Fuoss (Chemistry of Large Molecules," edited by Burk and Grummitt, Interscience Publishers, Inc. (1943), chap. 6). Although the factor of voltage has been largely overlooked in the published literature, I have found it to have an important influence in determining the frequencies at which the anomalous dispersion occurs and sometimes even the occurrence itself.

As is well domonstrated in this latter paper, although the consumption of energy by a given substance reaches a maximum when the applied frequency is equal to the reciprocal of ($2\pi$ times the "relaxation time") for the particular substance in its particular environment, the particular frequency at which such maximum energy absorption occurs is extremely sensitive to temperature and to the presence of other molecules in the vicinity of the polar molecules to which the field is attuned. Thus it was evident that this phenomenon could be of little significance for technical heating, since the increase in temperature necessarily involved in the heating would immediately take the material out of the range of maximum energy absorption. I have now found, however, that whereas this phenomenon is of little use so far as the older applications of high frequency for purposes of heating are concerned, it makes possible the application of alternating electrostatic fields to new uses, and by it I have obtained new, technically valuable results.

It is, accordingly, an object of my invention to improve the efficiency of application of energy in technical operations such as fusion, distillation, chemical reactions, etc. Another object of the invention is to improve the control available in such operations. Another object is to permit selective application of the energy to particular localities and/or to particular substances in a mass or body or group of bodies. Another object is to effect fusion, or other phenomena normally dependent on temperature, at temperatures below those at which they normally occur. Another object is to effect localized heating, e. g. within a body or vessel which is not heated throughout. Another object is to make available improved products and new products many of which could not satisfactorily have been made by previously known methods.

Although in the following specification and the accompanying drawings I am giving certain preferred examples and procedures and am suggesting various alternatives and modifications, it is to be understood that these are not intended to be exhaustive nor limiting of the invention, but on the contrary are given for purposes of illustrating and explaining the invention and the principles thereof and of its application to practical use so that others skilled in the art will be enabled to adapt it and apply it in numerous forms and with numerous modifications each as may be best suited to the conditions of a particular use.

In the drawings:

Figure 1 is a diagrammatic view in vertical section of a device designed for line welding of thermoplastic materials;

Figure 2 is a similar diagrammatic view in transverse section taken on line 2—2 of Figure 1;

Figure 3 is a diagrammatic, fragmentary view in actual section of a glass metal seal during process of manufacture according to the present invention, and Figure 4 is a similar view of a seal and process of manufacture for a metal wall vessel.

The operation of my invention can best be understood by thinking of the action of particular molecules in their response to the alternating electrostatic field. If we think of the molecules in question as having positive and negative charges separated in space along the molecule, it will be understood that the electrostatic field will exert a moment of force upon the molecule tending to attract the positive charge toward one electrode and the negative charge toward the other electrode and thus to align that portion of the molecule parallel to the axis of the electrostatic field. When the polarity of the field is reversed, the pull upon the molecules is likewise reversed and they tend to turn end for end in order to align themselves again with the direction of the field. If such a molecule stood alone in a vacuum, and the frequency of the alternations of the field were low, the molecule would tend to follow the alternations of the field completely and promptly. To the extent that there are present other molecules, ions, atoms, electrons, etc., they may conflict with such attempts to swing from the orientation to one polarity to the reversed orientation to the opposite polarity; the higher the viscosity of the material the greater is such interference by other molecules; and to the extent that such other molecules, etc. present in the same material are subject to thermal or other movements, these movements will tend to disrupt any orientation. Therefore, increase of temperature or exposure to radiations will, in general, affect the frequencies at which the anomalous dispersion occurs. In actuality, therefore, the molecules do not follow perfectly the alternation of the field, but tend to some extent to lag behind. Notwithstanding this lag, it has been observed that, within limits, the greater the frequency, the greater the agitation of the molecules. Likewise, I have shown that, the greater the voltage, the greater such agitation may become, i. e., the stronger will be the pull tending to orient the molecules; and, therefore, the more molecules will be oriented in a given half-cycle period.

The tendency of the responding molecules to lag behind the alternations of the field generally depends more upon the nature of the particular molecule and of other molecules with which it may conflict and upon the temperature and the viscosity of the material than upon the frequency of the field; but as the frequency of the field increases, so that the molecules are allowed less time after each reversal of polarity to align themselves to the reversed polarity of the field, more and more of the molecules will find the time allowed to each polarity insufficient to acquire even a partial orientation to the field. As more and more of the molecules find themselves thus unable to orient to each polarity of the field while it still exists, the motion of the molecules thus induced by the alternating field actually begins to decrease with further increase of frequency.

These latter phenomena are accompanied by an accelerating change in the dielectric constant of the material. This range is known as the range of "anomalous dispersion." This term is also used in some cases, in connection with ohmic-conductance and in optics in connection with the index of refraction; but as used in this application it relates to the phenomenon just described.

From what has been said above it will be understood that at the center of this range of anomalous dispersions, i. e., at the inflection point of the plot of dielectric constant against frequency (or usually the logarithm of the the frequency), the average of the motions of the molecules induced by the alternating field is at a maximum. If such motion is long continued, obviously it develops heat, since heat ultimately is a condition of agitation of the molecules of a substance; but, as the field is first applied, the temperature of the substance is not abruptly increased as might be expected from the induced agitation of the molecules. I have found therefore that, surprisingly, by utilization of this mechanism I can induce phenomena similar to those which occur at higher temperatures while the actual temperature of the material remains below that at which they ordinarily occur. Thus I have been able to weld together the surfaces of plastics which normally soften only at temperatures above the boiling point of water and yet immediately after that take the plastic in my bare hands without sensing such high temperatures. Likewise, I have, by this means, coagulated albumens in solutions wherein the temperature was controlled within a fraction of a degree, the coagulation appearing in all other respects to be the same as that produced thermally at a much higher temperature.

Moreover, since the relaxation time may be different for each molecule and for given molecules in each environment, I have found that by use of this mechanism I can selectively induce one substance within a body or material to behave as though it were at a higher temperature than the rest of the body. In this manner, for example, I may cause the surface of a body to fuse without fusing the interior. I may use cementing substances on the surface of a body which substances would normally fuse at a higher temperature than the body itself and yet soften the cementing substance without softening the whole of the body to which it is applied; and for many other purposes I may cause effects normally associated with heating and higher temperatures at a particular locality in a body or mass of material without causing substantial or objectionable heating of the mass or body as a whole. Likewise, I can selectively activate a particular compound for chemical reaction without affecting other compounds present with it in the same material and thus can increase the efficiency of a desired chemical reaction or even induce reactions which normally would not occur because of preferential action of other substances present with the reactants.

Although I have in the above referred particularly to the behavior of "molecules," I have also shown that in long molecules certain portions or even atoms, especially if having a dipole moment, either naturally or induced by distortion at higher voltages, etc., may respond individually to the alternating field, so that what has been said of molecules applies also to such portions of molecules. The same may apply to dipoles however formed, whether in molecules or atoms individually or in groups or in segments of them whenever they are oriented among themselves, however transient. In the case of segments of molecules having dipole moments such that they respond to the field individually, the agitation in the anomalous dispersion range is more nearly analogous to mechanical resonance, since it involves distortions against the intra-molecular forces.

In the utilization of the phenomenon described, I can take advantage of the fact that heating, diffusion or chemical changes resulting from the treatment can take the material out of the range of maximum energy absorption, i. e., of maximum activity of the molecules, to give an automatic control of the desired operation to avoid overheating, and the desired effect may thus be made to occur as an instantaneous action. Thus the wattage input may be increased to whatever value is required to obtain the desired action, whether fusion, diffusion, reaction, etc., and the resulting more or less violent agitation of the molecules, as they seek to follow the alternating field at the frequency of maximum orientation, will produce the desired results; but as soon as the secondary effect of heating occurs by transmission of this agitation through impact to other molecules, raising the temperature of the mass, the result is a change in the relaxation time of the substance in question, thereby changing the frequency at which the maximum energy absorption occurs and accordingly reducing sharply the energy absorption in the given frequency of the field.

In a similar manner, a frequency may be used which is higher than the center of the anomalous dispersion range under the starting conditions; and then by a simple heating effect of that frequency or by other means, the conditions may be changed so that an anomalous dispersion range of the material under treatment comes to include and preferably be approximately centered upon, the applied frequency.

In cases where a continued action is required, I have found that this can be achieved in either of two ways. In the first place I have used to advantage in such cases multiple or complex frequencies wherein one component of the frequency acts upon a substance under the conditions of the initial treatment; and a second frequency component of the electrostatic field acts upon the same or a different substance under the changed conditions produced by the first action, and if desired a third and additional components may subsequently come into action in the same way. In the second place I can adjust the frequency of the field to follow the shift of the anomalous dispersion range.

Thus, for example, in the bonding of plastics, it may be desirable first to diffuse a plasticizer into the contacting surfaces and then to soften the surfaces sufficiently so that they adhere. One frequency component of the electrostatic field may cause a mild agitation of the molecules of the plastic such as to effect a diffusion among them of the molecules of a plasticizer coated on the surface of the plastic. The resulting presence of the plasticizer and also any increase in temperature which may occur both affect the relaxation time for the molecules of the plastic and thus substantially terminate the initial agitation, when it has served its purpose. A second frequency component of the electrostatic field, however, may be designed to effect a violent agitation, under the changed conditions, of either the plasticizer or the plastic molecules, or two additional components may effect agitation of both substances under the changed conditions; and the surface material is thus softened and fused to the surface of an adjacent body. In some cases it may even happen that a second component of frequency will not be necessary, because the altered conditions may be such that the same frequency which causes the initial action, may, under the changed conditions cause the different action desired for the secondary effect.

In a like manner multiple frequencies may be used to activate individually and at the same time different components, or react them in a single mass, or to stimulate different mechanisms, e. g. fusion and polymerization.

Instead of using such multiple frequencies simultaneously the treatment may be continued with only the first frequency until diffusion is sufficiently progressed and may then be adjusted to a different frequency such as described above to effect softening of the plasticized portions. In other cases where a progressive action is desired, as in fusion of a mass by actual increase in temperature, or in progressive chemical reactions, as for example, polymerization reactions, the mass may be uniformly carried through the desired sequence by a progressive timed adjustment of the frequency of the field. The first frequency employed will produce the initial effect; and, as it takes effect in each part of the mass, that part will be removed from the effective influence of the field. As the frequency is changed, the field again becomes effective and again as the mass is heated or other desired effect is produced, that part is again removed from the influence of the field, and so on as the frequency is changed progressively successive effects are achieved, until the entire mass has reached the ultimate result.

The determination of the range of anomalous dispersion for any given substance is not my present invention, and is already well understood in the art. This may be accomplished by any available method, for example, as set forth in the paper of Gross, Ott and Arnold, Transactions of the Electro Chemical Society, vol. 74 (1938), pp. 193–210, or as set forth in the various papers cited in the article by Fuoss in the "Chemistry of Large Molecules," referred to above. A technique for determining the dielectric constant for fibers is set forth in the article by Errera and Sack in the Journal of Industrial and Engineering Chemistry, vol. 35 (1943), pp. 712–716. For ordinarily non-polar substances such as styrene polymers the determination may be by the heterodyne beat method or the resonance method described, for example, by Smyth, "Dielectric Constant and Molecular Structure" (A. C. S. Monograph No. 55), pp. 53 et seq., and Hartshorn, "High Frequency Measurements."

As a general procedure, one should first locate generally the anomalous dispersion range for the particular material and for the particular conditions of treatment, especially voltage, nature and geometry of electrodes, temperature, concentration and mixture with other substances. This can be done, for example, by determining the dielectric constant at low frequency, e. g. from a few cycles to 1000 cycles per second, then determining the optical index of refraction (the square of this will be the limiting value for the dielectric constant), and then determining the dielectric constant at different frequencies spotted at points throughout the electrical spectrum (i. e. at various frequencies). Wherever a substantial difference appears between the dielectric constant for the material at one frequency and the dielectric constant at the next frequency chosen (the other conditions being kept the same), at least a part of a range of anomalous dispersion lies between the frequencies used in these two tests. By making additional tests more closely spaced within this area of the electrical spectrum and with adjacent frequencies beyond the area and plotting the results, a typical "S" curve will result which will locate accurately the central frequencies of the anomalous dispersion range. It is important to make enough such determinations to plot the curve since the initial "spot" tests may include more than one anomalous dispersion range between them. When a test shows a dielectric constant equal to the square of the index of optical refraction, this indicates that no further anomalous dispersion will occur at higher frequencies at the given voltage. At higher voltages, however, there may be distortions of the molecule which cause anomalous dispersion which does not appear at lower voltage.

Known theory or experience may be drawn upon to indicate the likely ranges for the anomalous dispersion with various materials; but as yet it is better not to rely entirely upon these since the particular frequencies required will depend to a substantial extent upon environmental conditions such as temperature and voltage and particularly the presence of other ingredients, such as solvents, plasticizers, fillers and other compounding ingredients.

As already indicated above, the anomalous dispersion range which will be selected for the common plastic materials will usually be a frequency of the order of $10^7$ to $10^9$ cycles per second with voltages of the order of 10 to $10^2$. With higher voltages higher frequencies are desirable. As a general rule, I prefer to keep the treatment in the high frequency range, e. g. above $10^4$ or ultra-high frequency range, e. g. above $10^7$ and in some cases even above $10^9$. Lower frequencies, however, may be used for special purposes and there is evidence of some critical frequencies close to 1/second. It will often be found with materials of a complex or polymeric structure, that the same substance may have several anomalous dispersion ranges at different parts of the electrical spectrum. In such case, it is advantageous to select a treating range in the high frequency or ultra-high frequency range as indicated above.

Since, in working with very high frequencies, there is a strong tendency to ionization of air between the electrodes it is important to design the electrodes to minimize the tendency to electrical discharges. For this reason, the voltage gradient which may be used with a given pressure is limited. In general, I have found it advantageous to use as high a voltage gradient as possible while keeping a margin of safety below the voltage at which discharges would begin to occur. In particular, I have found that in the case of hydrocarbons and other compounds which are ordinarily regarded as non-polar or only weakly polar, the use of a high voltage gradient may so far distort the molecule as to give it a polar character, or due to the high field strength, even a slight separation of charges in (or displacement of parts of) the molecule or atom may be sufficient to cause it to orient in the field. To this end, and especially in connection with the use of high frequency fields for chemical reactions, I have found it advantageous to work at super-atmospheric pressure and the increased voltage gradients made possible by such higher pressures.

To the same end of utilizing as high voltage as possible without break-down between the electrodes, I have found it advantageous to use a refractory insulator, e. g., of beryllia, mica, mica substitutes, or other insulators resistant to the effects of temperature and high frequency. Such insulator may be fitted over the electrode, or may be used as a plate or plates interposed between the electrodes and the area of actual treatment. This expedient has the additional advantage of reducing the transfer of heat from the material being treated to the electrodes which are ordinarily good thermal conductors and would therefore tend to withdraw heat from the treating zone. However, in cases where the treatment is to take place at atmospheric temperature, or below, it may be an advantage to cool the electrodes and expose them directly to the material without such interposed insulation.

When the voltage used in my invention is increased, either in an ordinary range (not in an anomalous dispersion range) or at the center of the anomalous dispersion range, the ratio of energy absorption to the voltage-current (kva.) input is reduced; but if then the frequency is adjusted to come to the center of the anomalous dispersion range at the new voltage an improvement in energy absorption is attained over that at the lower voltage. Thus there is an unexpected advantage ultimately gained which is contrary to the disadvantage which is at first apparent. Since one of the important advantages of my invention is the possibility it gives of utilizing energy directly for useful chemical or physical effects of molecular agitation without dissipation of energy and other objectionable side-effect of heating, the use of relatively high voltage is important, giving an increase in efficiency by reason of the more intense agitation which it causes and the greater proportion of the molecules which it affects. Where, for any reason, the frequency band available for treatment is limited, the effect of voltage in shifting the anomalous dispersion range is ordinarily the most convenient method of bringing that range for a given material within the frequency band available. If both voltage and frequency are limited, a shifting of the range can be brought about by change of the temperature at which the treatment takes place; and if the feasible temperatures also are limited one would then choose a different material which would give the body an anomalous dispersion range in the available frequency band under the possible conditions of temperature and voltage.

The use of interposed insulation between the electrodes may have particular importance if some material in the body being treated tends to ionize or otherwise is capable of ohmic conduction under the conditions of treatment. Thus, some materials which are non-conducting as solids ionize upon fusion; and in such case it is important for full realization of the control possibilities of my invention to insulate the electrodes to prevent further heating by such ionic conduction. In other cases it is, however, desirable to omit the insulation and, after utilizing my invention to develop such ionic condition, to continue the treatment by passing an ionic current.

A further result of using the high frequencies most suitable to purposes of my invention, is the sensitivity of the circuit to various changes in dielectric between the electrodes. When the treatment is proceeding the circuit should be tuned to resonance at the particular frequency selected within the anomalous dispersion range and changes in the dielectric between the electrodes or in the spacing of the electrodes will, of course, affect the desired condition of resonance. Thus it is not ordinarily feasible to use the electrodes themselves as pressure platens or rollers, except in conjunction with automatic means for tuning the circuit. I have found that such tuning can be done successfully by placing a lamp in the electrostatic field which will be lighted at full brilliancy when the circuit is in resonance and the brilliancy of which decreases when the circuit is out of resonance. By means of a tuning motor controlled by a photo-electric relay the circuit may thus be kept in constant resonance and tuned to give the highest efficiency of treatment. Such device is described and claimed more in detail in a copending application. However, numerous other devices for automatic tuning may be used to the same end.

This sensitivity of the circuit to variations between the electrodes can be reduced by introducing as much capacitance as possible into the circuit in its original design. Ordinarily I find it preferable to avoid the necessity for such retuning of the circuit by using appropriate insulating platens or rolls. Thus as shown in the drawing, I have provided toroidal rolls 10 and 12 of refractory insulating material carried and pressed together by concave rubber rollers 14. Within these rollers 10 and 12 and accurately spaced apart are the electrodes proper 16 and 18, each connected to the high frequency oscillator circuit 20 by conductors 22 and 24 led in through an insulating tube 26 and connected at points distributed over the treating area of the electrode, as indicated at 28. It is an advantage of this arrangement that the electrode spacing can be adjusted at will to meet the requirements of the circuit without regard to variations in thickness of the material being treated, which only affects the separation of the insulating rolls 10 and 12.

Two sheets of material 30 to be welded together or seamed may be overlapped or abutted and passed between these rolls with the circuit properly adjusted to bring about resonance at the frequency selected as indicated above.

The material thus used may be a thermoplastic material either in solid film form as shown or in thicker, e. g., plate, form or in fibrous form, e. g., woven or felted or other fabric.

When a homogeneous material is used in this way, it is found that the molecules at the surface respond more readily to the alternating field, and therefore will have their range of anomalous dispersion at a somewhat higher frequency than the molecules in the interior of the body. Advantageously, therefore, the higher frequency is selected to give a maximum effect at the surface.

This effect may be further increased by the use of a surface coating to which the frequency is attuned. Thus a coating of a plasticizer may be used which will have a range of anomalous dispersion distinctly different from that of the interior of the body and the frequency used may be selected in its anomalous dispersion range or, as suggested above, a complex frequency may be used including both one in an anomalous dispersion range of the plasticizer and one in an anomalous dispersion range of the plastic material in the presence of the plasticizer; or the latter frequency may be used alone. Likewise inert materials may be added to the surface solely for the purpose of concentrating the effects of the high frequency field and imparting the energy to the surface molecules.

In the example illustrated in Figures 1 and 2 of the drawings, the sheets 30 may be of dense thermoplastic material, for example, cellulose acetate, and one or both of these sheets may have the facing surfaces coated with a suitable plasticizer, e. g., triacetin. In such case I have found that the range of anomalous dispersion to be used is between 2 and 20 megacycles for the acetate plastic and between 100 and 500 megacycles for the triacetin. Exact frequencies depend upon particular composition and conditions, and should, therefore, be determined for each case as set forth above.

The sheets are overlapped as shown in the drawings and are passed between the pressure rolls 10 and 12, one or both of which may be driven by suitable drive connections (not shown) through the pressure rolls 14. The rate of travel is regulated so that the material is exposed effectively to the high frequency field for a period of a fraction of a second to a very few seconds. The power consumption of the device is about 100 watts. As the material passes between the rollers there is an instantaneous fusing of the surface which, in combination with the pressure exerted by the rollers, causes an effective welding of the two sheets. Nevertheless the material comes out from between the electrodes without overheating and apparently at a temperature below the normal softening point of the thermoplastic.

As indicated above the same procedure may be followed with sheets of relatively pure thermoplastic material without addition to the surface of any plasticizer or other coating. In such case, however, the process is more sensitive to exact frequency control since the frequency to which the surface molecules respond is closer to that at which the interior molecules respond so that uncontrolled variations in the circuit may result in a softening of the entire sheet with a consequent squeezing out of material from between the rolls. In some cases this may be desirable and the frequency may, in that case, be chosen to agitate the interior molecules rather than those at the surface.

In a like manner a glaze or lacquer may be applied to suitable base. In such case, however, it is desirable to use a complex frequency or to use two or more units acting on the material at adjacent areas along its path of travel. One frequency would be used to soften the glaze or lacquer material which may be supplied to the base as a powder and a second frequency near the center of the anomalous dispersion range for the fused material would cause a sufficiently violent agitation of the molecules to flow the particles together into a smooth glaze. The glaze used may be inorganic glass or an organic resin; and if a thermosetting resin is used, the resin may be hardened by a third frequency to activate the portions of the molecule at which further polymerization or condensation occurs.

In a similar manner, with corresponding increase in the energy input, the sheets of material may be laminated by passing under cylindrical, rather than toroidal, rollers or by pressing between flat platens which carry the electrodes and at least one of which preferably carries a plate of an insulating material between it and the material being treated.

In many cases it may be desirable not to press the material while it is being treated in the high frequency field. Thus a continuous web of fabric composed at least in part of thermoplastic fiber may be passed through the high frequency field in accordance with my invention and the individual fibers thereby fused together where they come into contact. Thus one can avoid separation of the fibers or threads under tensile stress and shrinking of fabrics under various conditions. I have found it advantageous thus to treat knitted fabric, e. g. stockings, in order to prevent runs or "ladders" from forming when a thread is broken. Thus, also, I have found that felts, for example the batts made of thermoplastic fibers, e. g. cellulose acetate, fiber glass or rock wool, or non-softenable fibers coated with a material which becomes tacky on heating, can be made much stronger and more resistant to packing under the influence of gravity and vibration; and I have found that fabrics suitable for all purposes for which woven fabrics are now in use may be made by merely overlaying warp on the woof without interweaving and then bonding the threads at the junctures by passing the loose fabric through a high frequency field in accordance with my invention. These applications of the invention are more particularly claimed in my copending application Serial Nos. 503,494 and 508,206 filed respectively on September 23, 1943 and October 29, 1943, both now abandoned.

Another valuable use of my invention is in the manufacture of stretched fibers and films. The present invention not only affords an accurate control of softening but also tends by its action on the molecules to facilitate their orientation into the parallelism desired in the stretched fiber or film. If the fiber or film is passed through rolls between electrodes, similar to those shown in Figures 1 and 2, but of shape and size appropriate to the material being treated, and then through a second pair of rolls operating at higher speed, stretching will occur in the bight of the first rolls where the material is exposed to the alternating field. If the fiber or sheet is stretched in a high frequency uni-directional field (i. e. intermittent voltage), the tendency of the voltage to orient the molecules may be utilized to produce the orientation desired in the finished fiber or film. So long as the molecules are disoriented the high frequency field will cause agitation whereas as orientation to the field voltage becomes established there will be less and less tendency to relaxation between voltage peaks and therefore less and less agitation of the molecules, thus again giving an automatic control of the termination of the active treatment.

Another important application of my invention is in connection wtih so-called "shatter-proof" glass, wherein a sandwich is made of two layers of glass with a layer of plastic in the center bonded to both sheets of glass. In accordance with my invention, the bonding plastic of any desired composition may be formed in a film or sheet of any suitable thickness and assembled with the layers of glass. These may then be placed in a press with or without evacuation of the space between the sheets of glass and may be pressed together in order to expel all air from between the several layers. The high frequency field may then be imposed between electrodes on the platens of the press whereby the plastic "filling" of the sandwich is softened and rendered adherent by a frequency near the center of its anomalous dispersion range without objectionable heating of the glass itself. The binder in such case will be chosen so that its anomalous dispersion range is quite different from that of the glass.

Spot-welding of plastics obviously can be carried on in accordance with my invention by a technique very similar to that now used with metals excepting that the electrodes will be connected to a high frequency oscillator circuit tuned to an anomalous dispersion range of a material in the area of the weld, and advantageously they will be insulated by a coating of mica or beryllia, etc., in a manner similar to that illustrated in the drawings for the strip-welding technique.

My invention is also applicable to the powder molding of plastic and plastic-coated substances, and makes possible the obtaining of any desired degree of density of porosity. Granules, powders or fibers of the plastic material or of filler material coated with suitable plastic or other binders may be placed in a mold and compressed to any desired extent and, while held under such compression, subjected to a high frequency field which softens the binder and thus bonds the particles together. In this way fibers of any of the softenable materials such as cellulose acetate, Vinyon, nylon, fiber glass, etc., can be distributed in a mold and used directly for molding with the advantages of strength and toughness which come from high fiber reinforcement. Using heavier fiber such as nylon (polyamide) bristles of suitable length substantially curled and advantageously coated with a suitable plasticizer, e. g., diphenyl ether or chlorinated diphenyl, cushions may be formed which are very highly resilient and resistant against lumping even after long use.

By this technique ceramic materials may be bonded into desired structures more effectively and economically than by known methods of firing. Molded or cast clays and bonded sand, for example, may be exposed to an alternating electrostatic field the frequency of which is near the center of the anomalous dispersion range for a substance at the surfaces of the clay or sand particles. In like manner fusible particles, e. g. those formed as a by-product in production of glass wool and the ash formed in powdered coal burners, etc., may be filled into molds or spread out in sheets and sintered by my invention as above described to produce articles or sheets of controlled porosity. If denser articles are desired, the frequency can be chosen for the interior of the particles and the mass can be pressed at the same time that it is being subjected to the alternating electrostatic field.

Where it is desired to spot-weld, strip-weld or cut materials without pressure, I have found it advantageous to use ultra-high frequencies of the so-called "radar" range, e. g. of the order of $10^8$ or more cycles per second with parabolic reflectors which direct the field in a narrow beam to the area where the treatment is required.

In the highest frequency ranges it is probable that the orientation to the field is not by the molecule as a whole but by segments within the molecule; and, with high energy input, such separate agitation of segments within the molecule may result in decomposition. Where such decomposition is not desired, I have found that it may be corrected either by lessening the wattage input at a given frequency or by reducing the voltage or frequency. As indicated above and as more fully described and claimed in my copending application filed herewith, this effect may be taken advantage of for de-polymerization and decomposition reactions.

In Figure 3, I have shown another application of my invention wherein a lead-in wire 35 suitably provided with a sealing flange 36, advantageously secured to the wire by intermediate bonding glass 37, is sealed into an envelope 38. The flange 36 is fitted against the rim of an opening in the glass envelope 38 and a ring electrode 40 is placed around the periphery of the flange 36. This electrode and the wire 35 are respectively connected into a high frequency oscillator circuit so that a high frequency electrostatic field is established between them. The frequency of this field is regulated to effect a softening of the glass in the flange 36 and advantageously in the edge of the glass 38, which may be of the same composition, with the result that flange 36 is sealed to the envelope 38.

If the opening in the envelope 38 and the periphery of the glass 36 on the wire 35 are formed accurately, e. g. by a molding technique, the parts may be fitted together and bonded by surface fusion as described in general above, using a frequency or frequencies which operate selectively on the molecules at the facing surfaces; or, if desired, the surfaces may be coated with a material miscible with the glass to which the frequency is attuned. For this purpose I may use soluble silicates, silicanes, etc.

In cases where the envelope 38a is of metal or other conducting material, it may be formed, as shown in Figure 4, with a recess to receive a glass collar 36a accurately formed to fit in the recess 42 and to receive the wire 35 in its centarl opening. With the parts thus assembled a high frequency field is applied between the wire 35 and the metal of the envelope 38a with the frequency tuned to near the center of the anomalous dispersion range for the glass washer 36a, whereupon the softening of the glass occurs and consequent adhesion to the metal parts.

Although I have emphasized above the desirability in many cases of insulating the electrodes, e. g. as illustrated in Figures 1 and 2, my invention in its broader aspect is not limited to that and by suitable adjustment of the circuit to maintain the desired frequency below arcing voltage, the insulation may be omitted. In other cases, as illustrated in Figures 3 and 4, it may be more advantageous to omit such insulation and even to bring the electrodes into direct contact with the material being treated.

Although I have described above and find it advantageous to use a circuit tuned to resonance at the particular frequency selected, it is also possible to operate with de-tuned circuits and this may be advantageous where it is desired to continue a treatment of a given area over a greater period of time.

Although in the drawings I have indicated the electrodes as being connected to a tuned high frequency oscillator circuit, it should be understood that the particular circuit used is within the choice of those skilled in the art and may be designed according to the principles well-known and highly developed in connection with other high frequency apparatus. Ordinarily a crystal controlled oscillator will regulate the frequency of a control circuit which, after passing through the usual stages of amplification, will be coupled inductively to the actual electrode circuit, ordinarily through an intermediate tuning circuit by which a resonant condition is established, and with variable inductance to compensate for variations in the capacitance between the electrodes.

I claim:

1. The method of welding bodies of different composition, each of which embodies in its substance molecular units responsive to alternating electrostatic fields, those of said units adjacent the surface of said bodies having an anomalous dispersion range the center frequency of which is different from the center frequency of the corresponding anomalous dispersion range of similar units in the interior of the respective body, which method comprises exposing said bodies, while their surfaces are substantially in contact, to an alternating electrostatic field having one frequency near the center of the range of anomalous dispersion for molecular units at the surface of one of said bodies under the conditions of welding and another frequency near the center of the range of anomalous dispersion for molecular units at the surface of the other body under the conditions of welding.

2. The method of fusing a composite material which embodies in its substance different molecular units responsive differently to alternating electrostatic fields, which comprises exposing said material to an alternating electrostatic field of complex frequency having one frequency thereof near the center of an anomalous dispersion range for molecular units in said material at the initial temperature of the treatment and another frequency thereof near the center of the anomalous dispersion range for the same molecular units in said material at a higher temperature attained during the treatment.

3. In the application of energy selectively and successively to components of a composite material composed of a plurality of said components which embody in their substances respectively different molecular units which respond differently to alternating electrostatic fields, the method which comprises exposing said material to an alternating electrostatic field of complex frequency having a first frequency near the center of the anomalous dispersion range for the molecular units of one of said components in said material under the conditions and temperature initially encountered and a second frequency thereof near the center of the anomalous dispersion range for the molecular units of another of said components at a different temperature encountered during the treating process.

4. The method as described in claim 3 wherein the different temperature is produced by the absorption of energy at said first frequency.

ORLAN M. ARNOLD.

REFERENCES CITED

The following references are of record in the file of this patent:

UNITED STATES PATENTS

| Number | Name | Date |
| --- | --- | --- |
| 1,845,322 | Neuhauss | Feb. 16, 1932 |

(Other references on following page)

UNITED STATES PATENTS

| Number | Name | Date |
|---|---|---|
| 2,087,480 | Pitman | July 20, 1937 |
| 2,089,966 | Kassner | Aug. 17, 1937 |
| 2,125,316 | Ronci | Aug. 2, 1938 |
| 2,179,261 | Keller | Nov. 7, 1939 |
| 2,205,582 | Steimel | June 25, 1940 |
| 2,261,847 | Dufour et al. | Nov. 4, 1941 |
| 2,280,771 | Dufour et al. | Apr. 28, 1942 |
| 2,291,807 | Hart | Aug. 4, 1942 |
| 2,296,948 | Pitman | Sept. 29, 1942 |
| 2,333,412 | Crandell | Nov. 2, 1943 |

FOREIGN PATENTS

| Number | Country | Date |
|---|---|---|
| 417,501 | Great Britain | Sept. 28, 1934 |

OTHER REFERENCES

Meharg: "Heatronic Molding," MODERN PLASTICS, March 1943, p. 87.